United States Patent
Tsutsumi et al.

(10) Patent No.: US 8,825,386 B2
(45) Date of Patent: Sep. 2, 2014

(54) NAVIGATION APPARATUS

(75) Inventors: Yuuki Tsutsumi, Kariya (JP); Seiji Kato, Toyota (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 13/537,505

(22) Filed: Jun. 29, 2012

(65) Prior Publication Data

US 2013/0013194 A1 Jan. 10, 2013

(30) Foreign Application Priority Data

Jul. 6, 2011 (JP) ................................ 2011-150012

(51) Int. Cl.
*G01C 21/34* (2006.01)

(52) U.S. Cl.
USPC .......................................... 701/430; 701/450

(58) Field of Classification Search
USPC ................................. 701/430, 450
See application file for complete search history.

(56) References Cited

U.S. PATENT DOCUMENTS

| 6,405,128 | B1 * | 6/2002 | Bechtolsheim et al. | ...... 701/431 |
| 2011/0238294 | A1 | 9/2011 | Shikimachi et al. | |
| 2011/0313823 | A1 * | 12/2011 | Ikeuchi et al. | ...... 705/13 |
| 2012/0065811 | A1 * | 3/2012 | Nakamura et al. | ...... 701/1 |

FOREIGN PATENT DOCUMENTS

| JP | A-H6-88733 | 3/1994 |
| JP | 2005-172578 | 6/2005 |
| JP | 2006-064563 | 3/2006 |
| JP | A-2006-125883 | 5/2006 |
| JP | A-2008-261767 | 10/2008 |

OTHER PUBLICATIONS

Office Action mailed Apr. 9, 2013 in corresponding JP Patent Application No. 2011-150012 (and English translation).
U.S. Appl. No. 13/413,726, filed Mar. 7, 2012, Nakamura.

* cited by examiner

*Primary Examiner* — Mary Cheung
*Assistant Examiner* — Michael Berns
(74) *Attorney, Agent, or Firm* — Posz Law Group, PLC (57) ABSTRACT

A navigation apparatus having a road learning function includes a detector, a memory, an identifying device, a determination device, and a guidance device. The detector creates a learned road link connecting exit and return points in an existing link. The memory stores road information representing that the existing link forms a continuous road at an end of the learned road link. The identifying device identifies an entrance link into the end of the learned road link and an exit link from the end of the learned road link in a route. The road determination device determines whether the entrance and exit links form the continuous road. The guidance device prohibits the guidance on a direction to go at the end of the learned road link when the road determination device determines that the entrance and exit links form the continuous road.

5 Claims, 8 Drawing Sheets

NAVIGATION APPARATUS

CROSS REFERENCE TO RELATED APPLICATION

This application is based on Japanese Patent Application No. 2011-150012 filed on Jul. 6, 2011, the disclosure of which is incorporated herein by reference.

TECHNICAL FIELD

The present disclosure relates to a vehicle navigation apparatus for providing route guidance based on map data including learned road data that is obtained during running of a vehicle.

BACKGROUND

Typically, when a new road is added to map data used in a navigation apparatus, a map production company edits road data by using map edit software and updates the map data partially or wholly based on the road data. Specifically, the map production company collects new road data by driving a specialized vehicle on the new road and then spends several months creating new map data based on the collected road data. Since it takes a lot of time to create the new map data, the new map data may be no longer new when it is used in the navigation apparatus.

A navigation apparatus disclosed in JP-6-88733A or JP-2006-125883A has a road learning function to learn a new road, whose data is not in ready-made map data, based on a movement trajectory of a vehicle from an exit point to a return point. The exit point is a point where the vehicle exits an existing road, whose data exists in the ready-made map data. The return point is a point where the vehicle returns to another existing road.

In general, a navigation apparatus provides no guidance on a direction to go at an intersection, when a route to a destination follows a road, where the vehicle runs, through the intersection. In other words, a navigation apparatus provides no guidance on the direction to go at an intersection, when the vehicle needs to continue straight through the intersection.

However, in a navigation apparatus having a road learning function, even when the vehicle needs to continue straight through a new intersection learned by the road learning function, guidance indicating that the vehicle needs to continue straight through the new intersection is provided at the new intersection. A user may feel unpleasant with such unnecessary guidance.

SUMMARY

In view of the above, it is an object of the present disclosure to provide a navigation apparatus for prohibiting guidance on a direction to go at a new intersection learned by a road learning function when a route to a destination follows a road, where a vehicle runs, through the new intersection.

According to an aspect of the present disclosure, a navigation apparatus provides guidance to guide a vehicle through a predetermined route to a destination. The navigation apparatus learns a new road, which does not exist in a ready-made road data, based on a current position of the vehicle during running of the vehicle. The navigation apparatus includes a learned road detector, a road information storing device, a link identifying device, a road determination device, and a guidance device. The learned road detector creates a learned road link connecting an exit point in a first existing link to a return point in a second existing link. The first and second existing links exists in the ready-made road data. The road information storing device stores road information based on at least one of the first and second existing links. The road information represents that the at least one of the first and second existing links forms a continuous road at an end of the learned road link. The link identifying device identifies an entrance link into the end of the learned road link and an exit link from the end of the learned road link in the route. The road determination device determines whether the entrance and exit links form the continuous road represented by the road information. The guidance device prohibits the guidance on a direction to go at the end of the learned road link when the road determination device determines that the entrance and exit links form the continuous road represented by the road information.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
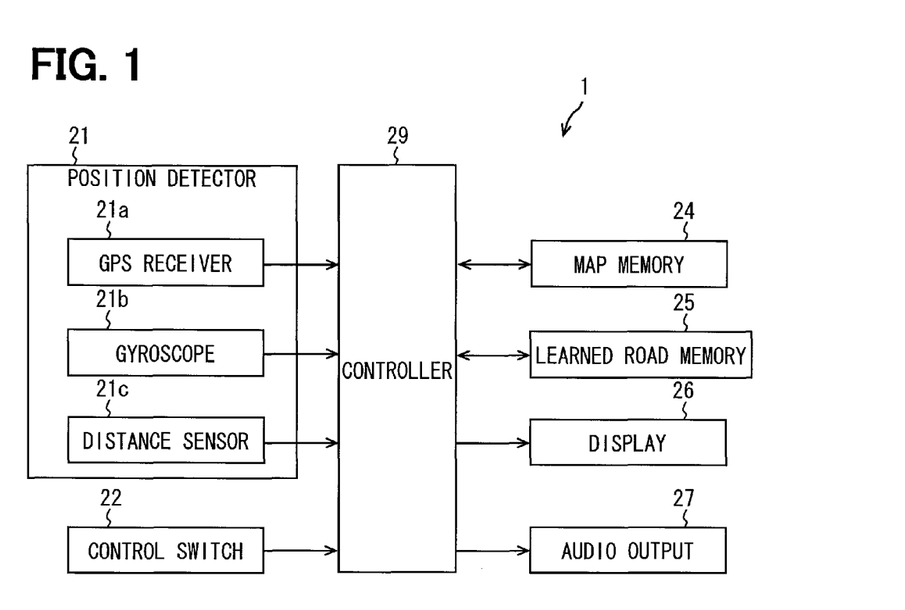
FIG. 1 is a block diagram of a navigation apparatus according a first embodiment of the present disclosure.

A navigation apparatus 1 according to a first embodiment of the present disclosure is described below with reference to FIG. 1. The navigation apparatus 1 is mounted on a vehicle. The navigation apparatus 1 includes a position detector 21 for detecting a current position of the vehicle, a control switch 22 for allowing a user to input a control command into the navigation apparatus 1, a map memory 24, a learned road memory 25, a display 26 for displaying information including a map, an audio output device 27 for outputting audio guidance, and a controller 29.

The position detector 21 includes a global positioning system (GPS) receiver 21a, a gyroscope 21b, and a distance sensor 21c. The GPS receiver 21a receives a GPS signal from a GPS satellite and detects the longitude, latitude, and altitude of the vehicle based on the GPS signal. The gyroscope 21b detects an angular velocity of rotary motion applied to the vehicle. The distance sensor 21c detects a distance traveled by the vehicle. The controller 29 calculates the current position, a heading direction, and a running speed of the vehicle based on output signals of the GPS receiver 21a, the gyroscope 21b, and the distance sensor 21c. For example, the controller 29 can calculate the current position of the vehicle by a known technique such as point positioning or relative positioning.

For example, the control switch 22 can include a touch panel switch displayed on a screen of the display 26 and a mechanical switch located around the display 26.

The map memory 24 stores ready-made map data, which is already prepared for a user by a map data provider, and outputs the ready-made map data to the controller 29. The map data stored in the map memory 24 includes road data, drawing data, map matching data, route guidance data, and design image data. The road data indicates a road connection condition by using nodes corresponding to specific points such as intersections and a link connecting the nodes. The drawing data is used to draw a map image. The map matching data is used to perform a so-called map matching. The route guidance data is used to provide route guidance. The design image data is used to draw a design of the map. For example, the map memory 24 can be an optical disk (e.g., CD, DVD) or an electrically or magnetically rewritable storage device (e.g., hard disk, flash memory).

The learned road memory 25 stores learned road data related to a new road learned by a road learning function of the navigation apparatus 1 and outputs the learned road data to the controller 29. According to the first embodiment, when the road learning function detects a new road, whose data exists neither in the ready-made map data stored in the map memory 24 nor in the learned road data already stored in the learned road memory 25, learned road data and auxiliary link data related to the detected new road are created and stored in the learned road memory 25.

The learned road data indicates the shape and attributes of a link of the learned road (i.e., detected new road) and a node at an end of the link of the learned road. The auxiliary link data includes an auxiliary link and an auxiliary node at an end of the auxiliary link. The auxiliary link supplementarily defines a link condition between a corresponding learned road and an existing road. The existing road is a road whose data exists either in the ready-made map data stored in the map memory 24 or in the learned road data already stored in the learned road memory 25. In a navigation process, the auxiliary link data is used as an alternative to road data of the existing road connected to the corresponding learned road. Thus, the learned road and the existing road are logically connected so that the consistency of the map including the learned road can be ensured without partially updating the map data. For example, the learned road memory 25 can be an electrically or magnetically rewritable storage device (e.g., hard disk, flash memory).

The display 26 is a color display such as a liquid crystal display (LCD). The display 26 displays a color image according to a video signal inputted from the controller 29. For example, the display 26 can display images of a map, a route from a departure point to a destination point, a current position mark representing the current position of the vehicle, and other guidance information. The audio output device 27 notifies a user of information by audible sound. Thus, the user can be provided with route guidance such as direction guidance through both the display 26 and the audio output device 27.

The controller 29 is configured as a microcomputer having a CPU, a ROM, a RAM, an input/output (I/O) device, and bus lines connecting these components. The controller 29 performs various processing, including the navigation process, based on programs and data read from the ROM, the map memory 24, and the learned road memory 25.

The navigation process performed by the controller 29 is described below. The navigation process includes a map display process and a route guidance process.

In the map display process, the controller 29 calculates the current position of the vehicle based on the output signal of the position detector 21. Then, the controller 29 reads data of a map of the area around the calculated current position from the map memory 24 and the learned road memory 25. Then, the controller 29 creates an image of the map of the area around the current position and causes the display 26 to display the map image. At this time, the controller 29 causes the display 26 to overlay the current position mark, representing the current position of the vehicle, on the map image. Further, when the vehicle moves, the controller 29 controls the display 26 so that the current position mark can move on the map image with movement of the vehicle and that the map image can be scrolled with the movement of the vehicle.

In the route guidance process, when a user sets a destination by using the control switch 22, the controller 29 reads road data from the map memory 24 and the learned road memory 25 and searches an optimum route from the current position of the vehicle to the destination by using the road data. The controller 29 causes the display 26 to overlay the optimum route on the map image. Then, the controller 29 controls the display 26 and the audio output device 27 so that guidance information can be displayed on the screen of the display 26 and outputted from the audio output device 27 by audio sound at predetermined timings. Thus, the controller 29 guides the vehicle though the optimum route to the destination Further, according to the first embodiment, the controller 29 performs a road learning process for archiving the road learning function of the navigation apparatus 1. In the road learning process, when the vehicle travels on a new road outside an existing road and an already-learned road, learned road data and auxiliary link data related to the new road are created based on a movement trajectory of the vehicle and then stored in the learned road memory 25. In the navigation process, the controller 29 reads the ready-made map data from the map memory 24, reads the learned road data and auxiliary link data from the learned road memory 25, creates map data based on the read data to ensure the consistency of the map data, and uses the map data.

Figure 2:
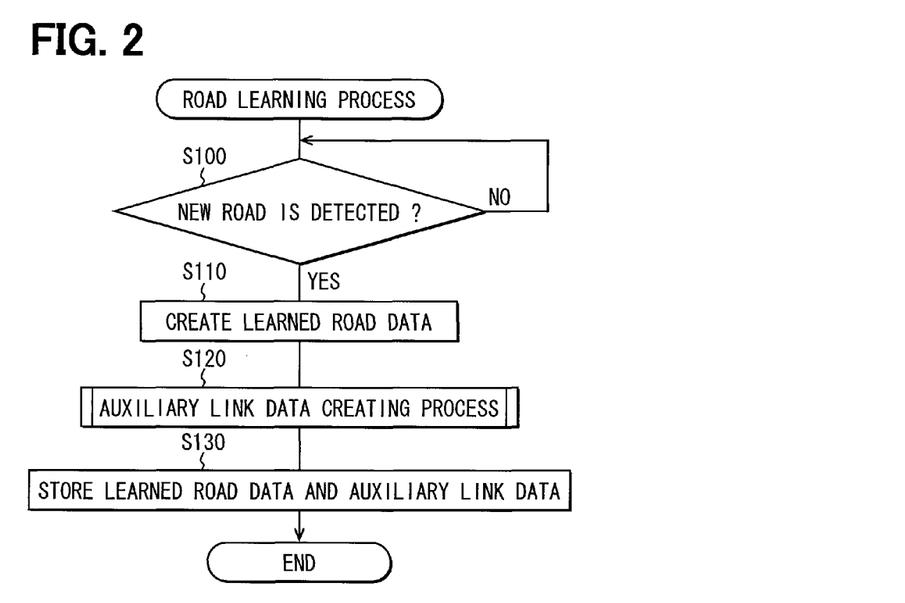
FIG. 2 is a flow chart of a road learning process performed by a controller of the navigation apparatus.

Next, the road learning process is described with reference to FIG. 2. The road learning process is performed by the controller 29 during running of the vehicle.

The road learning process starts at S100, where the controller 29 determines whether a new road is detected. The new road is a road whose data exists neither in the map memory 24 nor in the learned road memory 25. Specifically, the controller 29 detects the current position of the vehicle at a regular interval during running of the vehicle and obtains a movement trajectory of the vehicle as it moves from an exit point to a return point. The exit point is a point where the vehicle exits an existing road. The existing road is a road whose data exists either in the map memory 24 or in the learned road memory 25. The return point is a point where the vehicle returns to the same or different existing road. Here, it is assumed that the vehicle exits a first existing road and returns to a second existing road different the first existing road. When the controller 29 obtains the movement trajectory of the vehicle, the controller 29 determines that the new road is detected.

If the new road is detected corresponding to YES at S100, the road learning process proceeds to S110, where the controller 29 creates learned road data based on the movement trajectory of the vehicle from the exit point to the return point. The learned road data includes a learned road link and learned road nodes. The learned road link connects a connection point (i.e., the exit point) between the new road and the first existing road and a connection point between the new road and the second existing road. The learned road nodes are located at ends of the learned road link. That is, each learned road node is located at a corresponding connection point. Specifically, the learned road data includes information indicating a connection condition between the new road and each existing road and a set of coordinate points representing a shape of the new road between the exit point and the return point.

Then, the road learning process proceeds to S120, where the controller 29 performs an auxiliary link data creating process for creating auxiliary link data associated with the learned road data created at S110. As described in detail later, the auxiliary link data is created based on a copy of link data at the exit point and a copy of link data at the return point. A link of an existing road, based on which auxiliary link data is created, is hereinafter sometimes called the "base link".

Figure 3A:
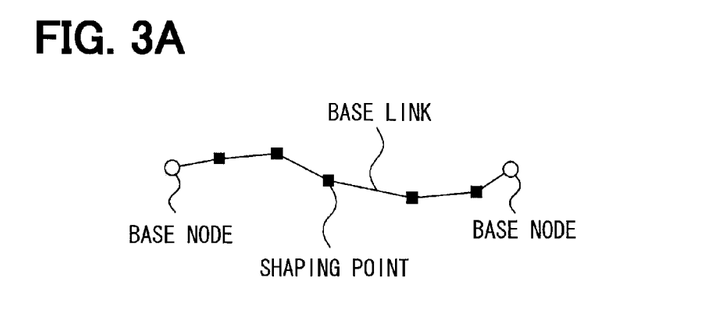
FIGS. 3A, 3B, and 3C are diagrams illustrating a method of creating auxiliary link data.

A method of creating the auxiliary link data is described below with reference to FIGS. 3A, 3B, and 3C. FIG. 3A illustrates a base link of an existing road and base nodes located at ends of the base link before learning of a new road. The base link has shaping points as a set of coordinate values for representing a shape of the existing road. Data of the base link and the base nodes has attribute information about a type of the existing road, a size of the existing road, and a connection destination of the existing road.

Figure 3B:
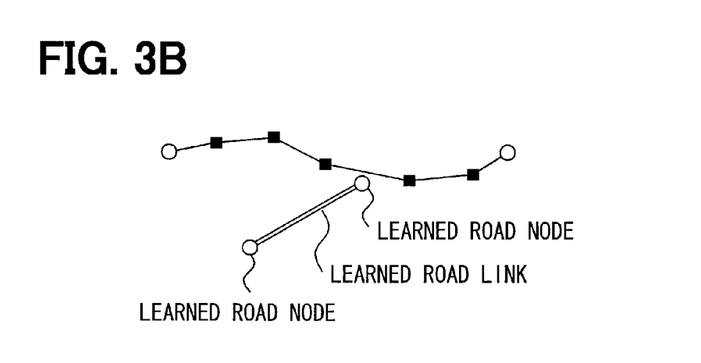

FIG. 3B illustrates a condition where a new road connecting to the middle of the existing road is detected. When the new road is detected, learned road data is created. The learned road data includes a learned road link and learned road nodes located at ends of the learned road link. The learned road link extends along the movement trajectory of the vehicle. One learned road node is located at one end of the learned road link. The other learned road node is located at the other end of the learned road link. The one learned road node corresponds to a connection point (i.e., exit or return point) between the learned road link and the base link.

Figure 3C:
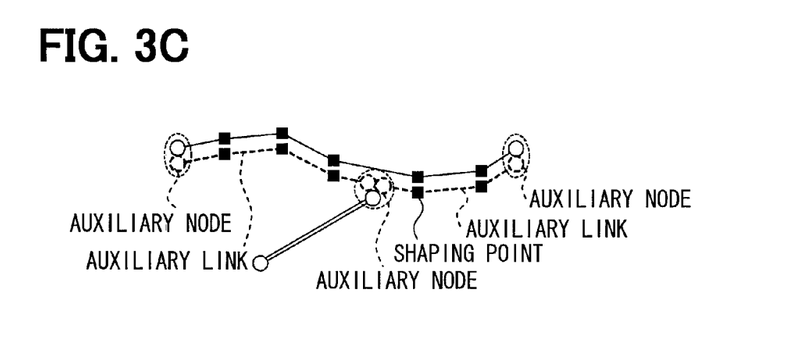

As shown in FIG. 3C, when the learned road data is created, auxiliary link data associated with the learned road data is created based on the base link and the base nodes. Specifically, the auxiliary link data is created by copying data of the base link and the base nodes and by dividing the copied base link at a connection point, corresponding to the one learned road node, between the copied base link and the learned road link.

Thus, as shown in FIG. 3C, a pair of auxiliary link data are created. One auxiliary link data is hereinafter called the "first auxiliary link data", and the other auxiliary link data is hereinafter called the "second auxiliary link data". The first auxiliary link data includes a first auxiliary link and first auxiliary nodes located at ends of the first auxiliary link. One of the first auxiliary nodes is located at a position corresponding to one base node, and the other of the first auxiliary nodes is located at a position corresponding to the connection point between the base link and the learned road link. The second auxiliary link data includes a second auxiliary link and second auxiliary nodes located at ends of the second auxiliary link. One of the second auxiliary nodes is located at a position corresponding to the other base node, and the other of the second auxiliary nodes is located at a position corresponding to the connection point between the base link and the learned road link. Each auxiliary link has the same shape and attribute information as a corresponding base link. Each auxiliary node has the same shape and attribute information as a corresponding base node. Further, as indicated by a broken line circle in FIG. 3C, nodes located at the same position are made associated with each other. Each auxiliary node has association information, indicating which node is associated with it, as the attribute information. For example, as shown in FIG. 3C, the other first auxiliary node, the other second auxiliary node, and the first learned node are located at the same position (i.e., the connection point between the base link and the learned road link), and therefore these three nodes are made associated with each other. In this case, each of the other first auxiliary node and the other second auxiliary node has association information indicating that the other first auxiliary node, the other second auxiliary node, and the first learned node are associated with each other.

Returning to FIG. 2, at S130, the controller 29 stores the learned road data created at S110 and the auxiliary link data created at S120 in the learned road memory 25. Then, the road learning process is ended. As mentioned above, each auxiliary node has the association information, indicating which node is associated with it, as the attribute information. Therefore, when the auxiliary link data is stored, an association between the auxiliary link and the base link is stored as road information.

Next, the auxiliary link data creating process, which is performed at S120 of the road learning process, is described in detail with reference to FIG. 4.

The auxiliary link data creating process starts at S121, where the controller 29 determines a connection manner in which a learned road link of the learned road data created at S110 is connected to a link of the existing road. Specifically, the controller 29 determines whether:

(1) The end of the learned road link is directly connected to the end of the existing road link.

(2) Both ends of the learned road link are connected to the same existing road link. That is, both the exit point and the return point are located in the same existing road.

(3) Another auxiliary link, which was previously created based on the existing road link as a base link, to which the learned road connects, already exists.

(4) The existing road, to which the learned road connects, exists in the ready-made map data stored in the map memory 24 or in previously-learned road data previously stored in the learned road memory 25.

The auxiliary link data creating process proceeds to S122, where the controller 29 determines, based on a result of the determination at S121, whether there is a need to create an auxiliary link corresponding to the currently detected learned road. Specifically, the controller 29 determines as follows:

(1) If the end of the learned road link is directly connected to the end of the existing road link, the controller 29 determines that there is no need to create the auxiliary link corresponding to NO at S122, and the auxiliary link data creating process is ended.

(2) If both ends of the learned road link are connected to the same existing road link, the controller 29 determines that there is a need to create the auxiliary link corresponding to YES at S122, and the auxiliary link data creating process proceeds to S123.

(3) If the other auxiliary link, which was previously created based on the link of the existing road, as a base link, to which the learned road connects, already exists, the controller 29 determines that there is a need to create the auxiliary link corresponding to YES at S122, and the auxiliary link data creating process proceeds to S123.

(4) If the existing road, to which the learned road connects, exists in the ready-made map data stored in the map memory 24 or in the previously-learned road data previously stored in the learned road memory 25, the controller 29 determines that there is a need to create the auxiliary link corresponding to YES at S122, and the auxiliary link data creating process proceeds to S123.

At S123, the controller 29 copies data of the existing road link (i.e., base link) and the nodes located at the existing road link (i.e., base nodes) and divides the copied base link at the connection point between the base link and the learned road link. Then, the auxiliary link data creating process proceeds to S124, where the controller 29 creates the auxiliary link data, including the auxiliary link and the auxiliary nodes, based on the divided base links and the copied base nodes. After S124, the auxiliary link data creating process is ended.

Figure 5A:
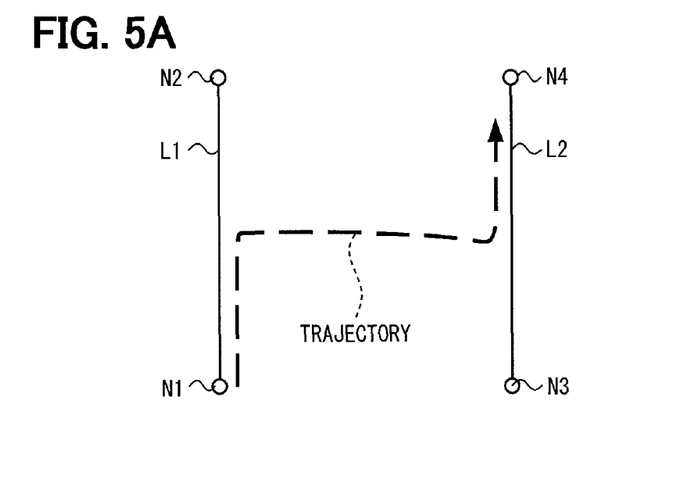
FIGS. 5A and 5B are diagrams illustrating an example of creating the auxiliary link data.
Figure 5B:
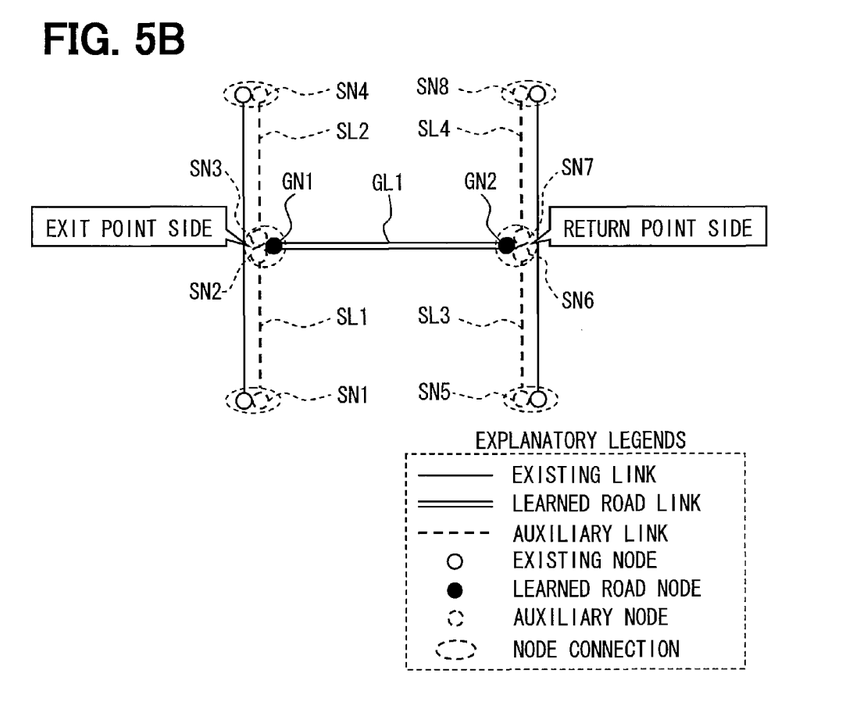

FIGS. 5A and 5B show one concrete example of creating auxiliary link data associated with a learned road that exits an existing road and returns to another existing road. In this case, as shown in FIG. 5A, a movement trajectory of the vehicle exits a link L1 of the exiting road at an exit point in the middle of the link L1 and returns to a link L2 of the other exiting road at a return point in the middle of the link L2.

Based on the movement trajectory, learned road data of the learned road is created. The learned road data includes a learned road link GL1, a learned road node GN1 at one end of the learned road link GL1, and a learned road node GN2 at the other end of the learned road link GL1. The learned road node GN1 is located on the exit point side, and the learned road node GN2 is located on the return point side.

Then, as shown in FIG. 5B, a pair of auxiliary link data is created based on data of the learned road node GN1 and a copy of data of the existing link L1 and nodes N1, N2 located at ends of the existing link L1. That is, the existing link L1 and the existing nodes N1, N2 are used as a base link. One auxiliary link data includes an auxiliary link SL1 and auxiliary nodes SN1, SN2 located at ends of the auxiliary link SL1. The other auxiliary link data includes an auxiliary link SL2 and auxiliary nodes SN3, SN4 located at ends of the auxiliary link SL2. Each of the auxiliary links SL1, SL2 corresponds to the existing link L1 divided at the exit point.

Likewise, a pair of auxiliary link data is created based on data of the learned road node GN1 and a copy of data of the existing link L2 and nodes N3, N4 located at ends of the existing link L2. That is, the existing link L2 and the existing nodes N3, N4 are used as a base link. One auxiliary link data includes an auxiliary link SL3 and auxiliary nodes SN5, SN6 located at ends of the auxiliary link SL3. The other auxiliary link data includes an auxiliary link SL4 and auxiliary nodes SN7, SN8 located at ends of the auxiliary link SL4. Each of the auxiliary links SL3, SL4 corresponds to the existing link L2 divided at the return point.

Next, a road determination process performed by the controller 29 is described with reference to FIG. 6.

The road determination process starts at S200, where the controller 29 determines whether a target node is a learned road node. According to the first embodiment, the target node is an intersection the vehicle is approaching. If the target node is the learned road node corresponding to YES at S200, the road determination process proceeds to S210. In contrast, if the target node is not the learned road node corresponding to NO at S200, the road determination process is ended.

At S210, the controller 29 identifies an entrance link into the learned road node and an exit link from the learned road node in the route.

Then, the road determination process proceeds to S220, where the controller 29 determines whether a first base link corresponding to the entrance link and a second base link corresponding to the exit link exist. If the first and second base links exist corresponding to YES at S220, the road determination process proceeds to S230. In contrast, if the first and second base links do not exist corresponding to NO at S220, the road determination process proceeds to S260. The step of S220 is described in detail later with reference to FIG. 7.

At S230, the controller 29 identifies the first and second base links. Then, the road determination process proceeds to S240, where the controller 29 determines whether the first and second base links are identical to each other. If the first and second base links are identical to each other corresponding to YES at S240, the road determination process proceeds to S250. In contrast, if the first and second base links are different from each other corresponding to NO at S240, the road determination process proceeds to S260.

At S250, the controller 29 determines that the route follows a road, where the vehicle runs, through the target node. In this case, the controller 29 prohibits route guidance on the direction to go at the target node.

At S260, the controller 29 does not determine that the route follows the road, where the vehicle runs, through the target node. In this case, the controller 29 provides route guidance on the direction to go at the target node.

Figure 7:
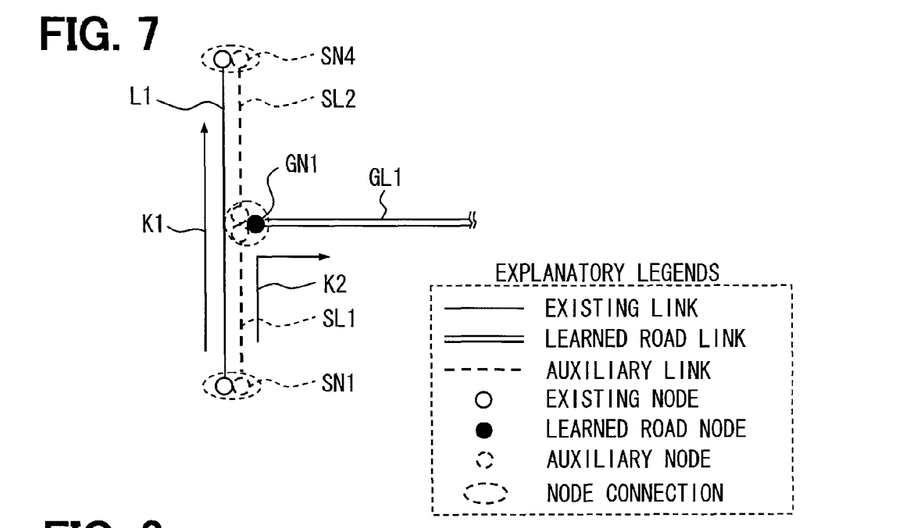
FIG. 7 is a diagram illustrating an example of determining a road by the road determination process of FIG. 6.

Two examples of the road determination process are described below with reference to FIG. 7. In FIG. 7, the vehicle travels through a route K1 or a route K2 under a condition where a new road branching from an existing link L1 is learned and the learned road is stored as a learned road link GL1.

Figure 6:
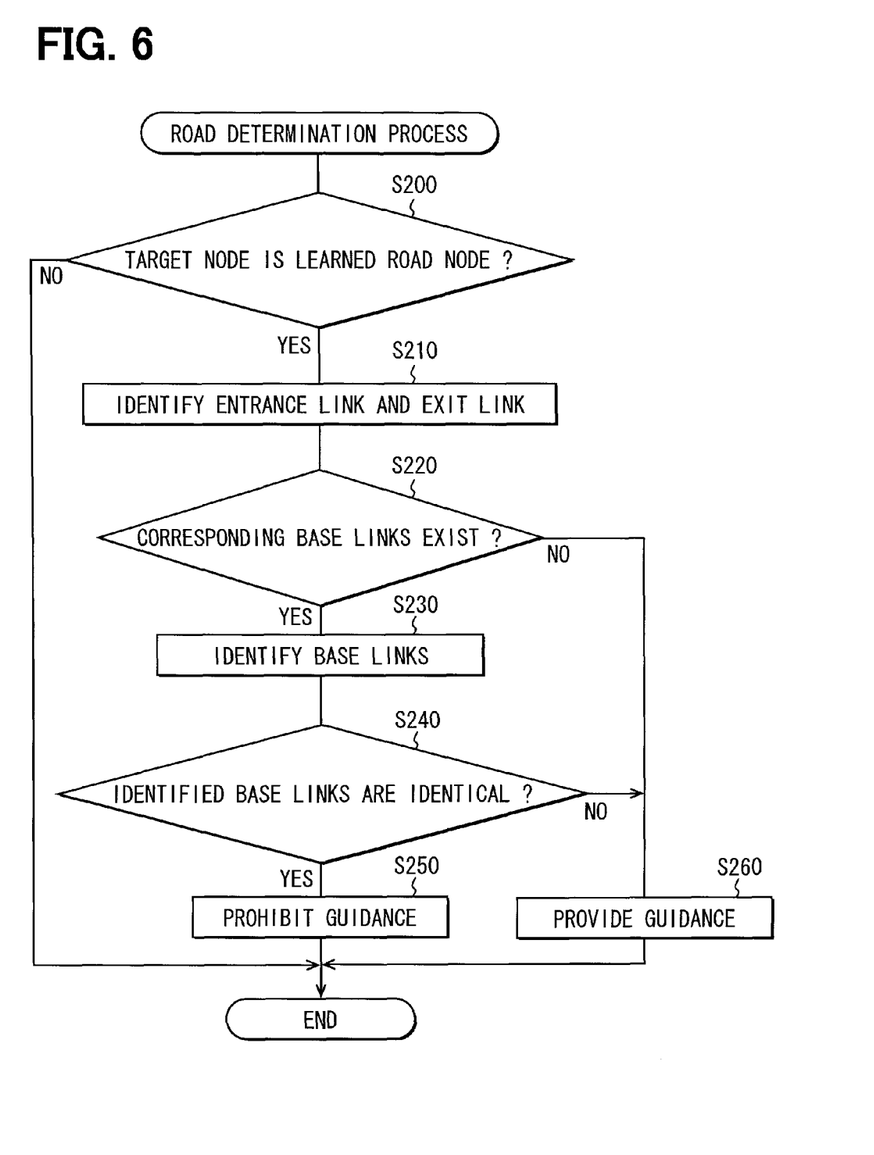
FIG. 6 is a flow chart of a road determination process performed by the controller of the navigation apparatus.

Firstly, when the vehicle travels through the route K1, the controller 29 determines whether a target node GN1 is a learned road node (at S200 in FIG. 6). Since the target node GN1 is included in a set of a learned road node and an auxiliary node associated with the learned road node, the controller 29 determines that the target node GN1 is a learned road node (YES at S200). Then, the controller 29 identifies an entrance link into the target node GN1 and an exit link from the target node GN1 (at S210) in the route K1. In the case of the route K1, the entrance link is identified as a link SL1, and the exit link is identified as a link SL2.

Then, the controller 29 determines whether a base link corresponding to the entrance link SL1 and a base link corresponding to the exit link SL2 exist (at S220 in FIG. 6). In the case of the route K1, the existing link L1 is a base link corresponding to each of the entrance link SL1 and the exit link SL2 (YES at S220). Therefore, the controller 29 identifies the existing link L1 as a base link (at S230). Since the base link corresponding to the entrance link SL1 is identical to the base link corresponding to the exit link SL2 (YES at S240), the controller 29 determines that the route K1 follows a road, where the vehicle runs, through the target node GN1 (at S250). In this case, the controller 29 prohibits route guidance on the direction to go at the target node. Therefore, the controller 29 does not provide route guidance on the direction to go at the target node GN1. Specifically, when the route is the route K1, route guidance indicating that the vehicle needs to go straight through the target node GN1 is not provided at the target node GN1.

Next, when the vehicle travels through the route K2, the controller 29 determines whether a target node GN1 is a learned road node (at S200 in FIG. 6). Since the target node GN1 is included in a set of a learned road node and an auxiliary node associated with the learned road node, the controller 29 determines that the target node GN1 is a learned road node (YES at S200). Then, the controller 29 identifies an entrance link into the target node GN1 and an exit link from the target node GN1 (at S210) in the route K2. In the case of the route K2, the entrance link is identified as a link SL1, and the exit link is identified as a link GL1.

Then, the controller 29 determines whether a base link corresponding to the entrance link SL1 and a base link corresponding to the exit link GL1 exist (at S220 in FIG. 6). In the case of the route K2, since a base link corresponding to the exit link GL1 does not exist (NO at S220), the controller 29 does not determine that the route K2 follows a road, where the vehicle runs, through the target node GN1 (at S260). Therefore, the controller 29 provides route guidance on the direction to go at the target node GN1. Specifically, when the route is the route K2, route guidance indicating that the vehicle needs to turn right at the target node GN1 is provided at the target node GN1.

As described above, when the target node (i.e., target intersection) is a learned road node, and a base link corresponding to the entrance link into the target node is identical to a base link corresponding to the exit link from the target node, the entrance link and the exit link form a continuous road at the target node GN1 (route K1). In contrast, when at least one of a base link corresponding to the entrance link into the target node and a base link for the exit link from the target node does not exist, the entrance link and the exit link do not form a continuous road at the target node GN1 (route K2). Therefore, by performing the step S220, it can be determined whether a traveling route of the vehicle follows a road, where the vehicle runs, through the target intersection.

Advantages of the navigation apparatus 1 of the first embodiment can be summarized as follows.

According to the first embodiment, when the learned road data is created (at S100, S110 in FIG. 2), the auxiliary link data is created (at S120) and stored together with the learned road data (at S130). At this time, the auxiliary link data is created based on a base link (at S123 in FIG. 4) and made associated with the base link (at S130 in FIG. 2).

In the route guidance, it is determined whether a target node (i.e., target intersection) is a learned road node (at S200). If the target node is the learned node (YES at S200), an entrance link into the target node and an exit link from the target node in the route are identified (at S210). Specifically, the entrance link and the exit link are identified based on the learned road data by using the auxiliary link. If a base link corresponding to the entrance link and a base link corresponding to the exit link exist (YES at S220), the base links are identified (at S230). If the identified base links are identical to each other (YES at S240), it is determined that the route guidance on the direction to go is unnecessary at the target node because the route follows a road, where the vehicle runs, through the target node (at S250). In contrast, if at least one of the base link corresponding to the entrance link and the base link corresponding to the exit link does not exist (NO at S220) or if the identified base links are not identical to each other (NO at S240), it is determined that the route guidance on the direction to go is necessary at the target node because the route does not follow a road, where the vehicle runs, through the target node (at S250).

In such an approach, when the traveling route of the vehicle follows a road, where the vehicle runs, through the learned road node, unnecessary route guidance is not provided at the learned road node. Thus, a user can be prevented from feeling unpleasant with such unnecessary route guidance.

Figure 4:
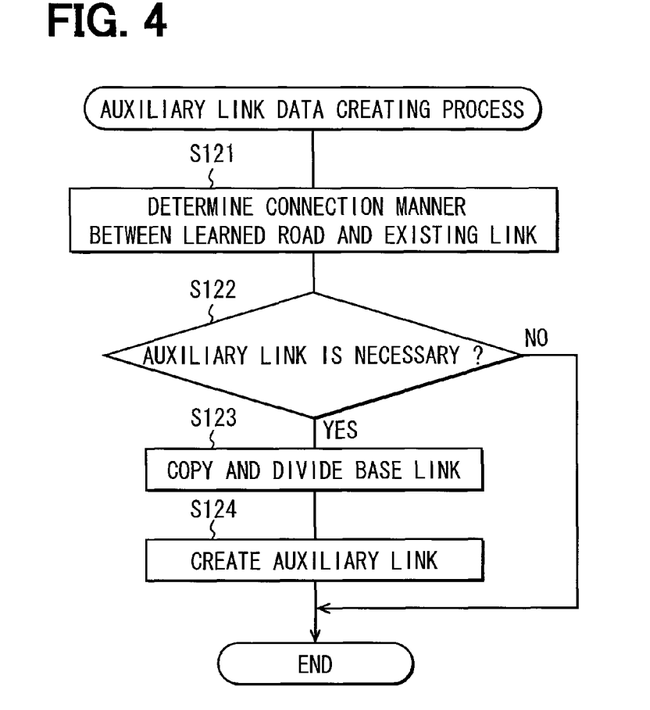
FIG. 4 is a flow chart of an auxiliary link data creating process as a part of the road learning process.

Further, according to the first embodiment, as shown in FIG. 4, the auxiliary link extending from the learned road node to the end of the base link is created. Then, the learned road data and the auxiliary link data are stored in the learned road memory 25 (at S130 in FIG. 2). Thus, the ready-made road data can be easily updated.

Further, according to the first embodiment, if at least one of the base links corresponding to the entrance and exit links does not exist (NO at S220), or if the base links corresponding to the entrance and exit links are not identical (NO at S240), it is determined that the route guidance on the direction to go is necessary at the learned road node (at S260). Thus, the navigation apparatus 1 can provide a user with route guidance on the direction to go at the learned road node when the vehicle approaches the learned road node. Therefore, the usability of the navigation apparatus 1 can be improved.

A correspondence between terms used in the first embodiment and claims is as follows. The controller 29 corresponds to a learned road detector, a road information storing device, a link identifying device, a road determination device, and a guidance device.

The controller 29 can serve as a learned road detector by performing S100, S110, and S120. The controller 29 can serve as a road information storing device by performing S130.

The controller 29 can serve as a link identifying device by performing S200 and S210. The controller 29 can serve as a road determination device by performing S220-S260.

Second Embodiment

A second embodiment of the present disclosure is described below. Although not shown in the drawings, a navigation apparatus according to the second embodiment has almost the same configuration as the navigation apparatus 1 shown in FIG. 1. However, according to the second embodiment, the map memory 24 is rewritable, and the ready-made map data stored in the map memory 24 is rewritten when a new road is learned. Therefore, the navigation apparatus does not have the learned road memory 25.

Next, a road learning process performed by a controller 29 of the navigation apparatus according to the second embodiment is described with reference to FIG. 8.

The road learning process starts at S300, where the controller 29 determines whether a new road is detected. The new road is a road whose data does not exist in the map memory 24. Specifically, the controller 29 detects the current position of the vehicle at a regular interval during running of the vehicle and obtains a movement trajectory of the vehicle as it moves from an exit point to a return point. The exit point is a point where the vehicle exits an existing road. The existing road is a road whose data exists in the map memory 24. The return point is a point where the vehicle returns to the same or different existing road. Here, it is assumed that the vehicle exits a first existing road and returns to a second existing road different the first existing road. When the controller 29 obtains the movement trajectory of the vehicle, the controller 29 determines that the new road is detected.

If the new road is detected corresponding to YES at S300, the road learning process proceeds to S310, where the controller 29 creates learned road data based on the movement trajectory of the vehicle from the exit point to the return point. The learned road data includes a learned road link and learned road nodes. The learned road link connects a connection point (i.e., the exit point) between the new road and the first existing road and a connection point between the new road and the second existing road. The learned road nodes are located at ends of the learned road link. That is, each learned road node is located at a corresponding connection point. Specifically, the learned road data includes information indicating a connection condition between the new road and each existing road and a set of coordinate points representing a shape of the new road between the exit point and the return point.

Then, the road learning process proceeds to S320, where the controller 29 creates new links by dividing a link of the existing road based on the learned road data created at S310. Then, the road learning process proceeds to S330, where the controller 29 adds road information to the attribute of the learned road node. The road information is represented by a combination of links. Then, the road learning process proceeds to S340, where the controller 29 stores the learned road data in the map memory 24 and rewrites the ready-made road data in the map memory 24. Then, the road learning process is ended.

Figure 9A:
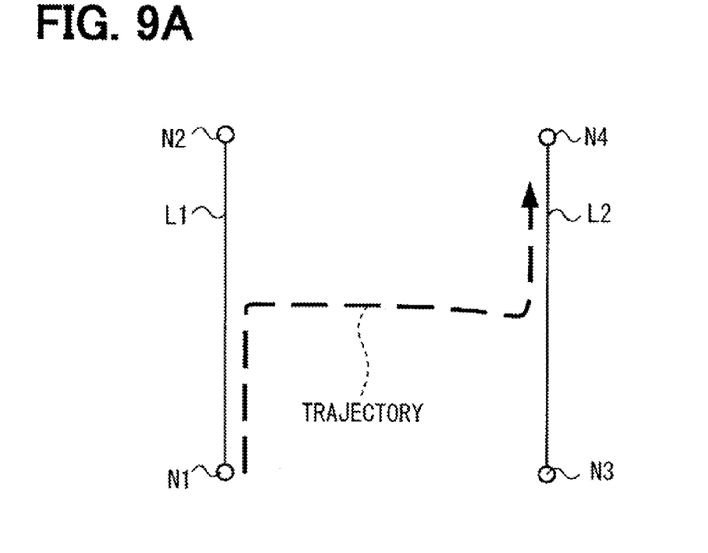
FIGS. 9A and 9B are diagrams illustrating an example of creating new links by dividing an existing link.
Figure 9B:
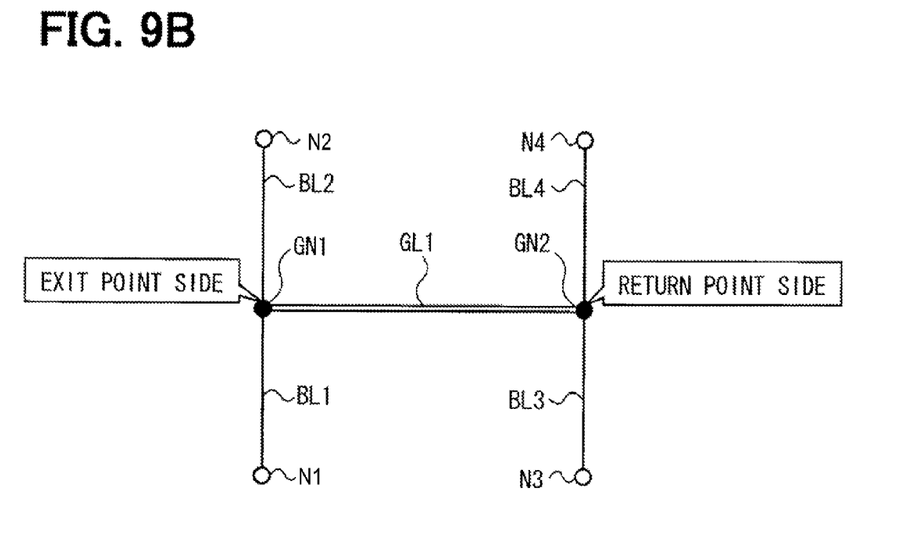

Next, a connection of the learned road to the existing road is described in detail with reference to FIGS. 9A and 9B. FIGS. 9A and 9B show one concrete example of division of existing link data associated with the learned road that exits the first existing road and returns to the second existing road different from the first existing road.

In this case, as shown in FIG. 9A, the movement trajectory of the vehicle exits a link L1 of the first exiting road at the exit point and returns to a link L2 of the second exiting road at the return point.

Figure 8:
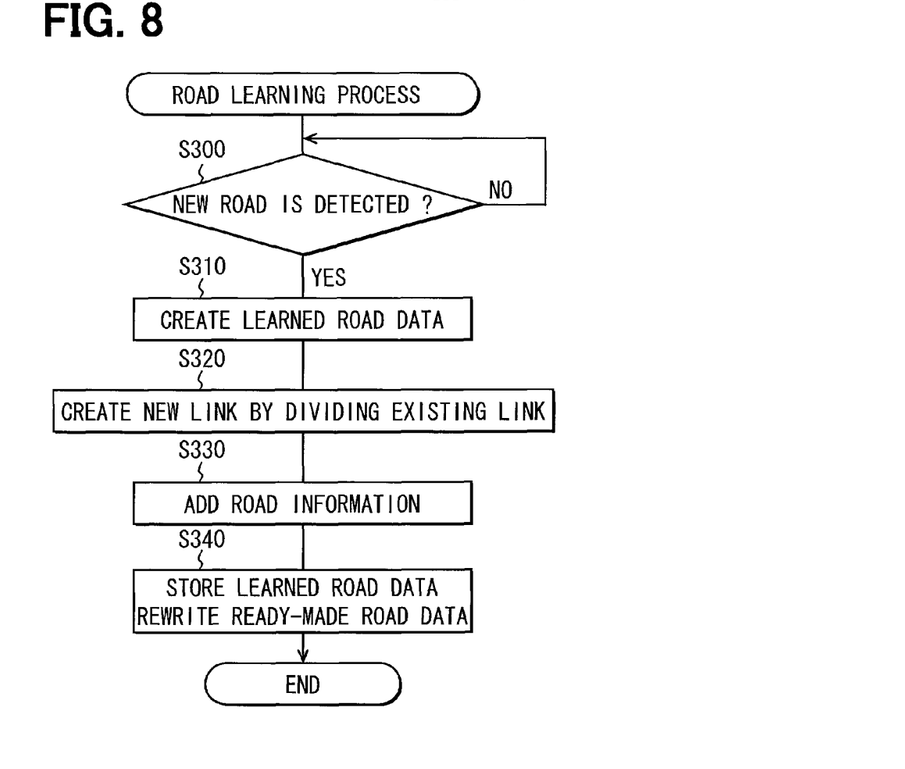
FIG. 8 is a flow chart of a road learning process performed by a controller of a navigation apparatus according a second embodiment of the present disclosure.

Based on the movement trajectory, learned road data of the learned road is created (at S310 in FIG. 8). The learned road data includes a learned road link GL1, a learned road node GN1 at one end of the learned road link GL1, and a learned road node GN2 at the other end of the learned road link GL1. The learned road node GN1 is located on the exit point side, and the learned road node GN2 is located on the return point side.

Then, as shown in FIG. 9B, the existing link L1 is divided into two new links BL1, BL2 (at S320). At this time, road information, representing that the new links BL1, BL2 form a continuous road at the end (i.e., the learned road node GN1) of the learned road link GL1, is added to the learned road node GN1 (at S330).

Then, the learned road data and the new links BL1, BL2, replacing the existing link L1, are stored in the map memory 24 (at S340).

Next, a road determination process performed by the controller 29 is described with reference to FIG. 10.

The road determination process starts at S400, where the controller 29 determines whether a target node is a learned road node. If the target node is the learned road node corresponding to YES at S400, the road determination process proceeds to S410. In contrast, if the target node is not the learned road node corresponding to NO at S400, the road determination process is ended.

At S410, the controller 29 identifies an entrance link into the learned road node and an exit link from the learned road node in the route.

Then, the road determination process proceeds to S420, where the controller 29 reads the road information represented by a pair of links. As mentioned previously, the road information is added to the learned road node based on the existing link (at S330 in FIG. 8).

Then, the road determination process proceeds to S430, where the controller 29 determines whether the entrance link and the exit link form a continuous road. If the entrance link and the exit link are identical to the pair of links represented by the road information corresponding to YES at S430, the road determination process proceeds to S440. In contrast, if the entrance link and the exit link are not identical to the pair of links represented by the road information corresponding to NO at S430, the road determination process proceeds to S450.

At S440, the controller 29 determines that the route follows a road, where the vehicle runs, through the target node. In this case, the controller 29 prohibits route guidance on the direction to go at the target node.

At S450, the controller 29 does not determine that the route follows the road, where the vehicle runs, through the target node. In this case, the controller 29 provides route guidance on the direction to go at the target node.

Figure 11:
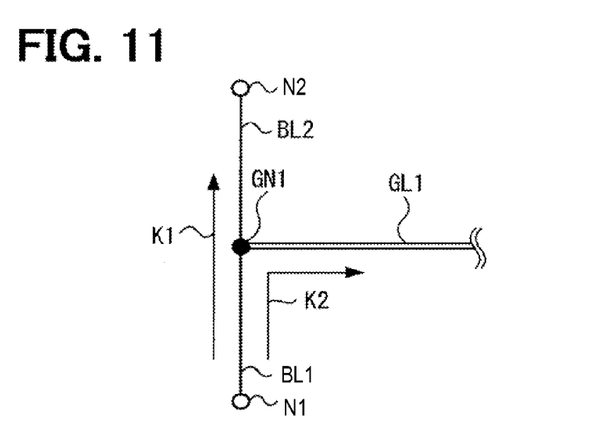
FIG. 11 is a diagram illustrating an example of determining a road by the road determination process of FIG. 10.

Two examples of the road determination process are described below with reference to FIG. 11 corresponding to FIG. 7.

Figure 10:
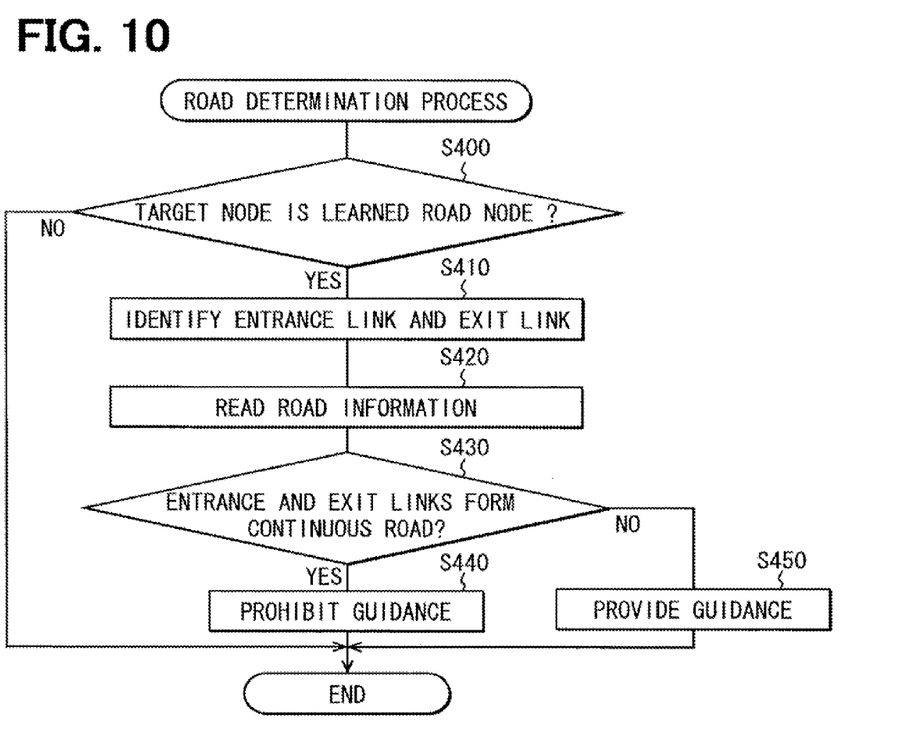
FIG. 10 is a flow chart of a road determination process performed by the controller of the navigation apparatus according the second embodiment.

Firstly, when the vehicle travels through the route K1, the controller 29 determines whether a target node GN1 is a learned road node (at S400 in FIG. 10). Since the target node GN1 is a learned road node, the controller 29 determines that the target node GN1 is a learned road node (YES at S400). Then, the controller 29 identifies an entrance link into the target node GN1 and an exit link from the target node GN1 (at S410) in the route K1. In the case of the route K1, the entrance link is identified as a link BL1, and the exit link is identified as a link BL2.

Then, the controller 29 reads the road information as information of the learned road node (at S420 in FIG. 10). Since FIG. 11 is based on assumption that a link L1 of an existing road is divided into new links BL1, BL2, the links BL1, BL2 as road information is added to attribute information of the learned road node. Therefore, the controller 29 reads the links BL1, BL2 as the road information.

Then, the controller 29 determines whether the entrance link and the exit link in the route K1 are identical to the links BL1, BL2 represented by the road information (at S430 in FIG. 10). In the case of the route K1, the entrance link is the link BL1, and the exit link is the link BL2 (YES at S430). Therefore, the controller 29 determines that the route K1 follows a road, where the vehicle runs, through the target node (at S440). In this case, the controller 29 prohibits route guidance on the direction to go at the target node.

In contrast, when the vehicle travels through the route K2, the entrance link is identified as a link BL1, and the exit link is identified as a link GL1 (at S410). As a result, the controller 29 determines that the entrance link and the exit link in the route K2 are not identical to the links BL1, BL2 represented by the road information (NO at S430). Therefore, the controller 29 does not determine that the route K2 follows the road, where the vehicle runs, through the target node (at S450). In this case, the controller 29 provides route guidance on the direction to go at the target node.

Advantages of the navigation apparatus of the second embodiment can be summarized as follows.

According to the second embodiment, when the learned road data is created (at S300, S310 in FIG. 8), the existing link in the ready-made road data is divided (at S320), and the road information is added to the learned road node (at S330). At this time, the learned road data is stored, and the ready-made road data is rewritten (at S340).

In the route guidance, it is determined whether the target node is the learned road node (at S400 in FIG. 10). If the target node is the learned road node (YES at S400), the entrance link into the learned road node and the exit link from the learned road node in the route are identified (at S410). Then, the road information associated with the learned road node is read (at S420). If the entrance link and the exit link form the continuous road represented by the road information (YES at S430), it is determined that the route follows a road, where the vehicle runs, through the target node (at S440). In contrast, if the entrance link and the exit link do not form the continuous road represented by the road information (NO at S430), it is determined that the route does not follow a road, where the vehicle runs, through the target node (at S450).

In such an approach, when the traveling route of the vehicle follows a road, where the vehicle runs, through the learned road node, unnecessary route guidance is not provided at the learned road node. Thus, a user can be prevented from feeling unpleasant with such unnecessary route guidance.

Further, according to the second embodiment, the new links are created by dividing the existing link in the ready-made road data (at S320 in FIG. 8), and the road information is added to the learned road node (at S330). Thus, the amount of the map data can be reduced.

Further, according to the second embodiment, if the entrance link and the exit link do not from the continuous road (NO at S430), it is determined that the route guidance on the direction to go is necessary at the learned road node (at S450). Thus, the navigation apparatus can provide a user with route guidance on the direction to go at the learned road node when the vehicle approaches the learned road node. Therefore, the usability of the navigation apparatus can be improved.

The controller 29 can serve as a learned road detector by performing S300, S310, and S320. The controller 29 can serve as a road information storing device by performing S330 and S340.

The controller 29 can serve as a link identifying device by performing S400 and S410. The controller 29 can serve as a road determination device by performing S420-S450.

MODIFICATIONS

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, the method, used in the second embodiment, in which the road information represented by a pair of links is added to the attribute of the learned road node, can be used in the first embodiment.

What is claimed is:

1. A navigation apparatus for providing guidance to guide a vehicle through a predetermined route to a destination, the navigation apparatus configured to learn a new road, which does not exist in a ready-made road data, based on a current position of the vehicle during running of the vehicle, the navigation apparatus comprising:
   a processor, the processor being configured to:
   create, in a learned road detector, a learned road link connecting an exit point in a first existing link to a return point in a second existing link, the first and second existing links existing in the ready-made road data;
   store, in a road information storing device, road information based on at least one of the first and second existing links, the road information representing that the at least one of the first and second existing links forms a continuous road at an end of the learned road link;
   identify, in a link identifying device, an entrance link into the end of the learned road link and an exit link from the end of the learned road link in the route;
   determine, in a road determination device, whether the entrance and exit links form the continuous road represented by the road information; and
   prohibit, in a guidance device, the guidance on a direction to go at the end of the learned road link when the road determination device determines that the entrance and exit links form the continuous road represented by the road information, wherein
   the learned road detector creates a first auxiliary link extending from a first end of a base link to the end of the learned road link and a second auxiliary link extending from a second end of the base link to the end of the learned road link,
   the base link is the at least one of the first and second existing link,
   the road information storing device stores an association between the base link and each of the first and second auxiliary links as the road information,
   the link identifying device identifies at least one of the entrance and exit inks by using the first and second auxiliary links, and
   the road determination device determines that the entrance and exit links form the continuous road represented by the road information, when the entrance and exit links are identified as the first and second auxiliary links extending along the same base link.

2. The navigation apparatus according to claim 1, wherein the guidance device provides the guidance at the end of the learned road link when the road determination device does not determine that the entrance and exit links form the continuous road represented by the road information.

3. A navigation apparatus for providing guidance to guide a vehicle through predetermined route to a destination, the navigation apparatus configured to learn a new road, which does not exist in a ready-made road data, based on a current position of the vehicle during running of the vehicle, the navigation apparatus comprising:
   a processor, the processor being configured to:
   create, in a learned road detector, a learned road link connecting an exit point in a first existing link to a return point in a second existing link, the first and second existing links existing in the ready-made road data;
   store, in a road information storing device, road information based on at least one of the first and second existing links, the road information representing that the at least one of the first and second existing links forms a continuous road at an end of the learned road link;
   identify, in a link identifying device, an entrance link into the end of the learned road link and an exit link from the end of the learned road link in the route;
   determine, in a road determination device, whether the entrance and exit links form the continuous road represented by the road information; and
   prohibit, in a guidance device, the guidance on a direction to go at the end of the learned road link when the road determination device determines that the entrance and exit links form the continuous road represented by the road information, wherein
   the learned road detector creates a pair of new links by dividing the at least one of the first and second existing links at the end of the learned road link,
   the pair of new links replaces the at least one of the first and second existing links, the road information storing device stores the pair of new links as the road information, the road determination device determines that the entrance and exit links form the continuous road represented by the road information, when the entrance and exit links are identical to the pair of new links, and the road determination device determines that the entrance and exit links do not form the continuous road represented by the road information, when the entrance and exit links are not identical to the pair of new links.

4. The navigation apparatus according to claim 3, wherein the guidance device provides the guidance at the end of the learned road link when the road determination device does not determine that the entrance and exit links form the continuous road represented by the road information.

5. A navigation apparatus for providing guidance to guide a vehicle through a predetermined route to a destination, the navigation apparatus configured to learn a new road, which does not exist in a ready-made road data, based on a current position of the vehicle during running of the vehicle, the navigation apparatus comprising:

a processor, the processor being configured to:

create, in a learned road detector, a learned road link connecting an exit point in a first existing link to a return point in a second existing link, the first and second existing links existing in the ready-made road data;

store, in a road information storing device, road information based on at least one of the first and second existing links, the road information representing that the at least one of the first and second existing links forms a continuous road at an end of the learned road link;

identify, in a link identifying device, an entrance link into the end of the learned road link and an exit link from the end of the learned road link in the route;

determine, in a road determination device, whether the entrance and exit links form the continuous road represented by the road information; and prohibit, in a guidance device, the guidance on a direction to go at the end of the learned road link when the road determination device determines that the entrance and exit links form the continuous road represented by the road information, wherein the guidance device provides the guidance at the end of the learned road link when the road determination device does not determine that the entrance and exit links form the continuous road represented by the road information.

\* \* \* \* \*